United States Patent [19]

Ofek et al.

[11] Patent Number: 5,680,640
[45] Date of Patent: Oct. 21, 1997

[54] SYSTEM FOR MIGRATING DATA BY SELECTING A FIRST OR SECOND TRANSFER MEANS BASED ON THE STATUS OF A DATA ELEMENT MAP INITIALIZED TO A PREDETERMINED STATE

[75] Inventors: Yuval Ofek, Hopkinton; Moshe Yanai, Brookline, both of Mass.

[73] Assignee: EMC Corporation, Hopkinton, Mass.

[21] Appl. No.: 522,903

[22] Filed: Sep. 1, 1995

[51] Int. Cl.$^6$ .................................................. G06F 13/10
[52] U.S. Cl. ........................ 395/839; 395/439; 395/488; 395/489; 395/492; 395/670; 395/182.05
[58] Field of Search ........................... 395/182.04, 600; 364/232.2, 238.4, 248.1

[56] References Cited

U.S. PATENT DOCUMENTS

| | | | |
|---|---|---|---|
| 3,771,137 | 11/1973 | Barner et al. | 395/447 |
| 4,974,156 | 11/1990 | Harding et al. | 395/489 |
| 5,101,492 | 3/1992 | Schultz et al. | 395/575 |
| 5,367,698 | 11/1994 | Webber et al. | 395/800 |
| 5,435,004 | 7/1995 | Cox et al. | 395/575 |
| 5,459,857 | 10/1995 | Ludlam et al. | 395/182.04 |
| 5,479,654 | 12/1995 | Squibb | 395/600 |
| 5,506,986 | 4/1996 | Healy | 395/600 |
| 5,522,031 | 5/1996 | Ellis et al. | 395/182.04 |
| 5,535,381 | 7/1996 | Kopper | 395/600 |

Primary Examiner—Thomas C. Lee
Assistant Examiner—Anderson I. Chen
Attorney, Agent, or Firm—Pearson & Pearson

[57] ABSTRACT

A system and method for providing on-line, real-time, transparent data migration from a first data storage system to a second data storage system. The first data storage system which had previously been coupled to a host, network or other data processing system is disconnected from the host and connected to a second data storage system. The second data storage system is coupled to the host or data processing system. The second data processing system includes a data map or table which indicates which data elements are stored on the second data storage system and which corresponding data elements on the first data processing device have been copied to the second data storage system. When the host, network or data processing system requests data from a data storage system, the second data storage system determines whether or not the data is stored on the second or first data storage system. If the data is stored on the second data storage system, the data is made available to the requesting device. If the data is not stored on a second data storage system, the second data storage system issues a request to the first data storage system, retrieves the data, makes the data available to the requesting device, writes the data to the second data storage system and updates the data element map or table. When not busy servicing other requests, the second data storage system scans the data map or table to determine which data elements from the first data storage device have not been copied to the second data storage device, and performs copying of the data and updating of the data map or table in the background, independent of any coupled host, network or other similar data processing device.

26 Claims, 4 Drawing Sheets

SYSTEM FOR MIGRATING DATA BY SELECTING A FIRST OR SECOND TRANSFER MEANS BASED ON THE STATUS OF A DATA ELEMENT MAP INITIALIZED TO A PREDETERMINED STATE

FIELD OF THE INVENTION

This invention relates to data storage systems and more particularly, to a system and method for on-line replacement of an existing data storage subsystem.

BACKGROUND OF THE INVENTION

Data processing centers of businesses and organizations such as banks, airlines and insurance companies, rely almost exclusively on their ability to access and process large amounts of data stored on a data storage device. Data and other information which is typically stored on one or more data storage devices which form part of a larger data storage system is commonly referred to as a database.

Databases are nearly always "open" and constantly "in use" and being accessed by a coupled data processing system, central processing unit (CPU) or host mainframe computer. The inability to access data is disastrous if not a crisis for such business and organizations and will typically result in the business or organization being forced to temporarily cease operation.

During the course of normal operations, these businesses and organizations must upgrade their data storage devices and data storage systems. Although such upgrading sometimes includes only the addition of data storage capacity to their existing physical systems, more often than not upgrading requires the addition of a completely separate and new data storage system. In such cases, the existing data on the existing data storage system or device must be backed up on a separate device such as a tape drive, the new system installed and connected to the data processing unit, and the data copied from the back-up device to the new data storage system. Such activity typically takes at least two days to accomplish. If the conversion takes more than two days or if the business or organization cannot withstand two days of inoperability, the need and desire to upgrade their data storage system may oppose an insurmountable problem.

Some prior art data copying methods and systems have proposed allowing two data storage systems of the same type, a first system and a second system, to be coupled to one another, and allowing the data storage systems themselves to control data copying from the first to the second system without intervention from or interference with the host data processing system. See for example, the data storage system described in U.S. patent. application No. 08/052,039 entitled REMOTE DATA MIRRORING, fully incorporated herein by reference, which describes one such remote data copying facility feature which can be implemented on a Symmetrix 5500 data storage system available from EMC Corporation, Hopkinton, Mass.

Although such a system and method for data copying is possible, in most instances, the first and second data storage systems are not of the same type, or of a type which allow such a "background" data migration to take place between the two data storage systems, unassisted by the host and while the database is open. Additionally, even on such prior art data storage systems, migrating data as a "background" task while the database is "open" does not take into account the fact that the data is constantly changing as it is accessed by the host or central processing unit and accordingly, if the old system is left connected to the host, there will always be a disparity between the data which is stored on the old data storage system and the data which has been migrated onto the new data storage system. In such cases, the new data storage system may never fully "catch up" and be able to be completely synchronized to the old data storage system.

Accordingly, what is needed is a system and method for allowing data migration between a first data storage system and a second data storage system while the database is open and in real-time, completely transparent to the host or data processing unit.

SUMMARY OF THE INVENTION

This invention features a system and method for providing on-line, real-time, transparent data migration between two data storage devices. The system includes a first data storage device which was previously coupled to an external source of data including a data processing device such as a host computer, or a network which may be connected to a number of data processing devices such as a number of host computers. The data processing device such as a host computer reads data from and writes data to the data storage device. The first data storage device initially includes a plurality of data elements currently being accessed by the data processing device.

At least one second data storage device is provided which is coupled to the first data storage device and to the data processing device, for storing data elements to be accessed by the data processing device. The second data storage device preferably includes a data element map including at least an indication of whether or not a particular data element is stored on the second data storage system.

In one embodiment, the second data storage system independently migrates data from the first to the second data storage system independently of the source. In another embodiment, the second data storage system is responsive to the external source, for migrating data from the first to the second data storage system.

In yet another embodiment, the data processing device issues a data read request (in the case of a read data operation), or a data write command (in the case of a write operation). The request is received by the second data storage device. In the case of a read operation, second data storage device examines the data map or table to determine whether or not the data has been migrated to and is stored on the second data storage device. If it is determined that the data is stored on the second data storage device, the data is made available to the requesting device.

If the data is not stored on the second data storage device, the second data storage device issues a data request, in the form of a read data command, to the first data storage device, obtains the data and makes the data available to the requesting device. The data received from the first data storage device is also written to the second data storage device and the data map updated.

In the case of a write operation, one embodiment contemplates that if the data received from the data processing device is destined for a location on the data storage system that has not yet been copied or 'migrated' from the older or first data storage device (a data storage location marked in the data map as 'need to migrate'), and the data is not a full or complete data element (for example, not a 'full track' of data) the write operation is suspended, the "complete" data element from the corresponding location (a "full track" for example) on the first data storage device is read into the cache memory on the second data storage device, the in-cache flag or bit set, the data storage location marked or identified as 'write pending', and the write operation resumed meaning that the data will be 'written' to and over the 'full track' of data now stored in the cache memory of the second data storage system. In other embodiments, the older data may not be retrieved from the first or older data processing device if the new data to be written is known to be a complete data element (a 'full track' for example).

When the second data storage device is not busy handling data read or write requests from a coupled data processing device, such as a host computer, the second data storage system examines its data map/table to determine which data elements are resident on the first data storage device and are not stored on the second data storage device. The second data storage device then issues read requests to the first data storage device requesting one or more of those data elements, receives the data, writes the data to the second data storage device and updates the data,map/table to indicate that the data is now stored on the second data storage device.

In this manner, there is no need to perform time consuming off-line data migration between first and second data storage devices but rather, the data copying or migration can occur in real-time, while the data storage devices are on-line and available to the host or other requesting device, and completely transparent to the coupled data processing device.

In the preferred embodiment, the second data storage device further includes or is coupled to a data storage device system configuration device, such as a computer, which provides configuration data to the data element map or table on the second data storage device, allowing the second data storage device to be at least partially configured in a manner which is generally similar or identical to the first data storage device.

Additionally, the preferred embodiment contemplates that the second and first data storage devices are coupled by a high speed communication link, such as a fiber optic link employing the "ESCON" communication protocol. The preferred embodiment also contemplates that the data storage device includes a plurality of data storage devices, such as disk drives. In this case, data elements may include one or more of a disk drive volume, track or record.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

The present invention features a system and method for providing on-line, real-time, transparent data migration between two data storage systems, at least one of which is coupled to a data processing device such as a host computer.

Figure 1:
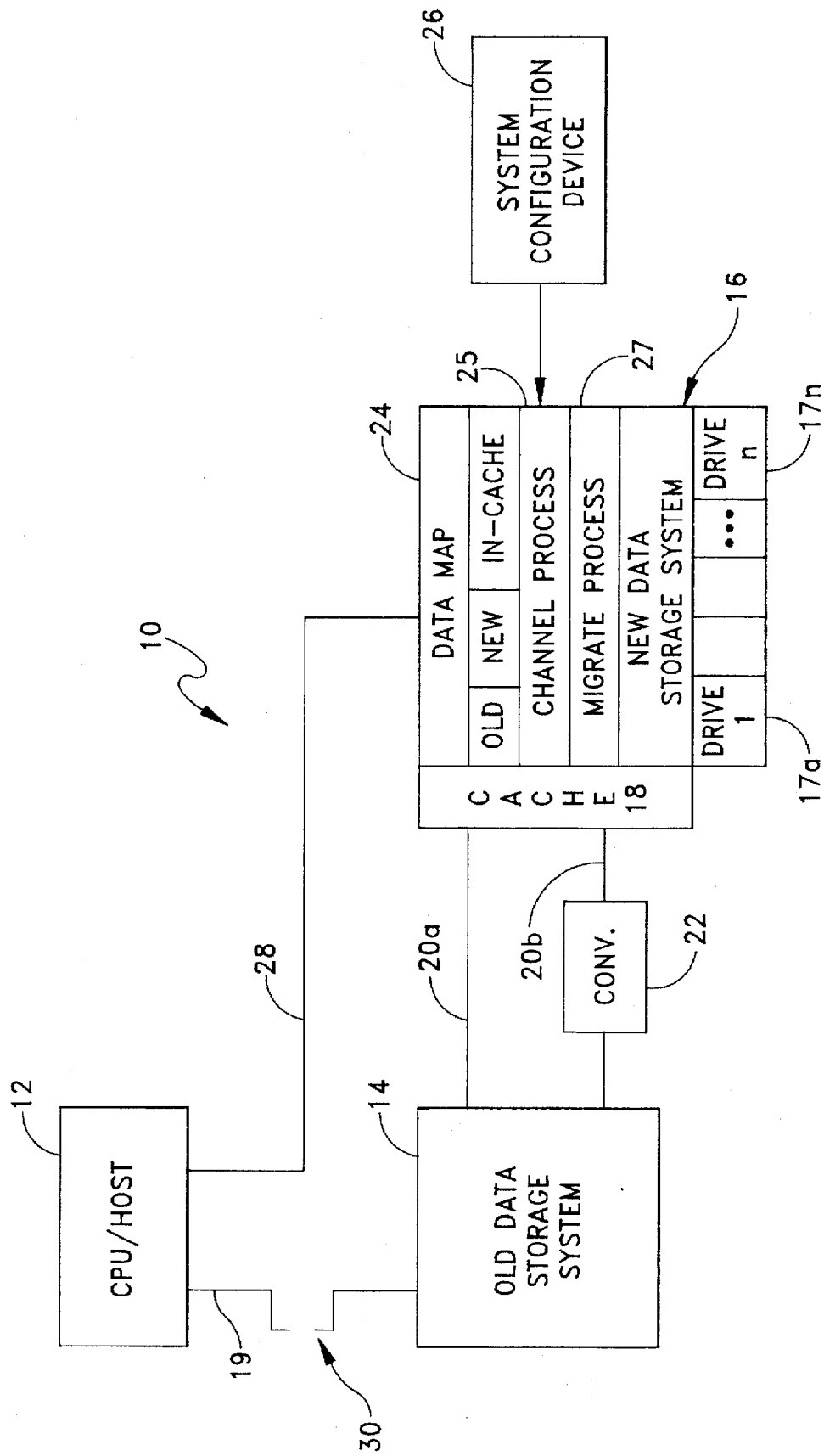
FIG. 1 is a schematic diagram of an exemplary data processing and data storage system on which the system and method for providing on-line, data transparent data migration between first and second data storage systems in accordance with the present invention may be accomplished.

An exemplary system 10, FIG. 1 on which the present invention may be performed and implemented includes a host computer, central processing unit or other similar data processing device 12. The data processing device 12 is initially coupled to a first data storage system 14. In most instances, the first data storage system 14 is an older data storage system which is either not large enough to handle the needs of the data processing device 12, or for some other reason is going to be completely or partially replaced or augmented by the addition of a second data storage system 16.

The first data storage system 14 is initially coupled to the data processing device 12 by means of a data communication link 19. The second data storage system 16 is coupled to the first data storage system 14 by means of one or more data communication paths 20a, and/or 20b. Examples of data communication paths 20a–20b include an IBM "bus and tag" connection well known to those skilled in the art, and higher speed fiber optic connections such as an ESCON data connection.

If the first and second data storage systems 14, 16 have an incompatible data communication protocol or interface, a protocol converter 22 may be provided on one or more of the data communication links 20a, 20b as required, and as is well known in the art.

The second data storage system 16 includes a data map or table 24 of data elements which are stored on at least the second data storage system 16. The data map or table is established during the set-up or configuration of the second data storage system 16 and is dependent on the particular configuration of the second data storage system 16.

Preferably, the data map/table 24 also includes information about data elements which are stored in the first data storage system 14, the use of such a data map/table will be explained in greater detail below.

The second data storage system 16 is typically and preferably coupled to a data storage system configuration device 26 such as a computer, which allows the user to configure the second data storage system 16 and the data map/table 24 as desired by the user. In the preferred embodiment, the second data storage system 16 is at least partially configured exactly as the first data storage system 14 is configured in terms of the number of logical devices, storage size, storage system type (3380/3390, for example) etc.

In the preferred embodiment, the data storage system configuration device 26 allows the user to configure at least a portion of the data storage area on second data storage system 16 to include data element storage locations or addresses which correspond to data element storage addresses on the first data storage system 14.

In the preferred embodiment, the second data storage system 16 is a disk drive data storage system employing a large number of fixed block architecture (FBA) formatted disk drives 17a–17n, and adapted for storing large amounts of data to be accessed by a host computer or other data processing device 12. The exemplary second data storage system 16 also typically includes a cache memory 18 which serves to hold or buffer data read and write requests between the second data storage system 16 and the host or other data processing device 12. Such data storage systems are well known to those skilled in the art and include, for example, the Symmetrix 5500 series data storage system available from EMC Corporation, Hopkinton, Mass., a description of which is incorporated herein by reference.

Initially, the second or new data storage system 16 is first coupled to the first data storage system 14 by means of one or more data communication links or paths 20a, 20b. After the second data storage system 16 has been configured using a system configuration device 26 or other similar or equivalent device, or by the host 12, the second data storage system 16 is coupled to the host computer 12 or other data processing device by means of a data communication path 28.

Preferably, data communication path 28 is a high speed communication path such as a fiber optic "ESCON" communication path, although any and all other communication paths are considered to be within the scope of the present invention. Immediately before connecting data communication path 28 between the host or other data processing unit 12 in the second data storage system 16, the previously existing data communication path 18 between the host 12 and the first data storage system 14 is disconnected or severed as illustrated at arrow 30.

Thus, in contrast with the prior art whereby the host or other data processing system 12 must be taken off line for a number of days in order to allow for backing up of data on the first data storage system 14 followed by the replacement of the first data storage system 14 with a second data storage system 16 and subsequent copying of all of the data onto the new data storage system 16, or a host which remains coupled to the original 'first' data storage system 14, the present invention only requires the host computer or other data processing device 12 to be off line or service interrupted for a relatively short period of time (the procedure typically takes approximately 10 minutes or less), while the first data signal path 19 is severed or disconnected and the second data signal path 28 is established between the second or new data storage system 16 and the host computer or other data processing device 12.

Accordingly, after the second data storage system 16 has been connected to the host or other data processing unit 12, whenever the host or data processing unit 12 issues a request to read data from or write data to "its" data storage system, the request is received by the second data storage system 16. Using a bit or flag from the data map/table 24 previously established and configured, the second data storage system 16, by scanning data map/table 24, determines whether or not the data requested (in the case of a read operation) is stored on the first data storage system 14 or on the second data storage system 16.

Such a hierarchical data map/table 24 is further explained and exemplified herein as well as in U.S. Pat. Nos. 5,206,939 and 5,381,539 assigned to the assignee of the present invention and both fully incorporated herein by reference.

If the data is already stored in the second data storage system 16, the second data storage 16 retrieves the data (perhaps temporarily storing the data in cache memory 18) as is well known in the art, and makes the data available to the host or other requesting data processing device 12.

If the requested data is not on the second data storage system 16, channel or real-time data handling process 25 of the second data storage system 16 issues a read data request to the first data storage system 14 in the manner and format native or known to the first data storage system 14 (for example, standard IBM data read commands). Channel or real-time data handling process 25 is, in the preferred embodiment, a software program comprising a series of commands or instructions which receives one or more commands from the second data storage system interface to the host or CPU (typically called a "channel"), interprets those commands, and issues one or more corresponding commands which can be acted upon by the first data storage system. Such an 'interpreter' type of software is well known to those skilled in the art.

The first data storage system 14 then retrieves the requested data and provides it to the second data storage system 16. The second data storage system 16 then makes the data available to the host or other data processing unit 12 which has requested the data.

Since the second data storage system now has a copy of the data, the data will be written to the second data storage system 16 and the appropriate data map/table 24 flags or bits updated to indicate that the data has been migrated to the second data storage system 16 so that next time the same data element is requested, the second data storage system 16 will have the data already stored on the system and will not have to request it from the first data storage system.

Further, as will be explained in greater detail below, the second data storage system 16 can perform a "background" data migration procedure or process 27. The "background" data migration procedure of process 27 is, in the preferred embodiment, a software program including a series of instructions which coordinate, monitor and control data migration. Whenever the second data storage system is not busy handling data input/output requests from the host or other data processing device 12, the migrate process 27 of the second data storage system 16 determines which data on the first data storage system has not been copied by reading a specified flag or bit in its data table/map 24, and copies or "migrates" the data from the first data storage system 14 to the second data storage system 16 completely transparent to the host 12, and often in parallel with the channel process 25 which may be retrieving data from the first data storage system 14 in response to requests from the host or CPU 12, while maintaining full accessibility to the data by the host or other data processing device 12.

Figure 2:
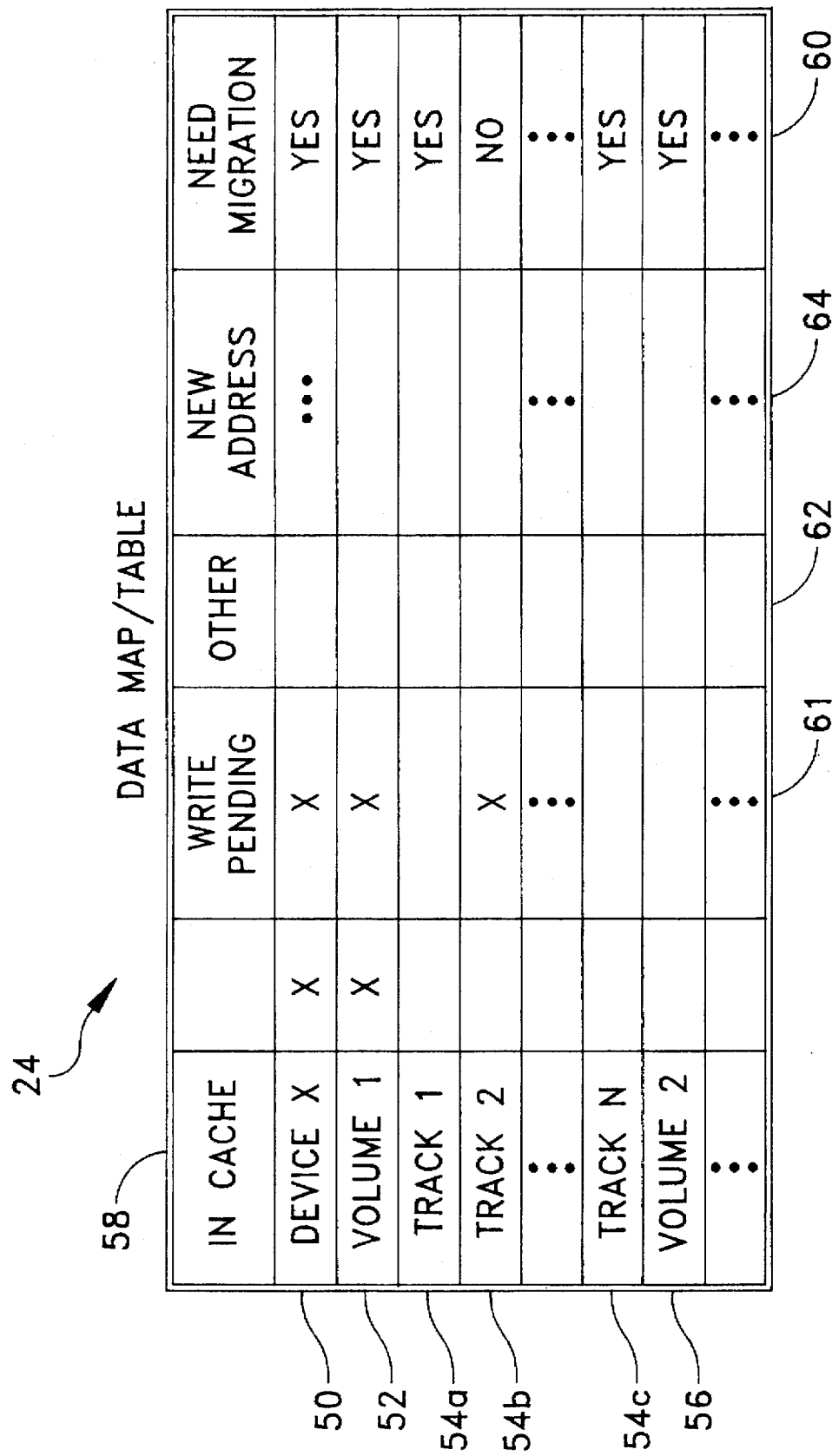
FIG. 2 is a schematic illustration of a data element map or table.

An exemplary data element map/table 24 is shown in greater detail in FIG. 2. In the preferred embodiment, the data map/table 24 is organized in a hierarchical fashion. For example, for the preferred embodiment wherein the data storage system includes a plurality of longer term data storage devices such as disk drives 17a–17n, and wherein each disk drive is partitioned into one or more logical "volumes" and each volume comprises a number of disk drive tracks, the data map/table 24 will first have an entry 50 for each physical and/or logical device such as a disk drive.

The device entry 50 will be followed by an entry 52 for a first logical volume, followed by one or more entries 54a–54c for each track of the device which comprises the logical volume 52. The entries 52, 54a–54c for the first logical will be followed by entry line 56 for the second logical volume configured on the physical device indicated by the entry at line 50.

All information about the data storage system and each device in the data storage system with the exception of the "data in cache" indication flag or bit 58 is stored in hierarchical format in the data map/table 24. Thus, whenever the second data storage system 16 desires or needs to obtain information about a particular data element (be it an individual data record, track or volume), the data storage system 16 scans the data map/table 24 beginning at the device level 50 to determine whether or not the desired criterion or characteristic has been established for any track or volume of a device.

There will be a 'flag' or other similar indicator bit set, or other indication of the desired characteristic in the device entry 50, in the volume entry 52 and in the appropriate track entry 54 if the desired characteristic is found in that portion of the data storage device represented by the data map/table 24.

For example, the preferred embodiment of a data map/table 24 includes a write pending flag or bit 61 which is set if a particular data element is presently stored in cache 18 of the second data storage system 16 and must be written to longer term storage such as a disk drive 17a–17n. For exemplary purposes, assuming that track 2 of volume 1 is in cache 18 in the second data storage system 16 and write pending, the write pending flag or bit 61 and the in cache bit 58 at line entry 54b (for track two) will be set, as will the write pending bit 61 of volume 1 at line 52 of the data map/table 24, as will the write pending bit 61 of the device at line 50.

Thus, if the second data storage system 16 wishes to determine whether or not a particular track or record which has been requested is write-pending or has been migrated to the second system or of the status of some other attribute or characteristic, the data storage system 16 first determines which device or disk drive 17a–17n the data element is stored on and then checks the appropriate indicator flag bit for that device. If the particular indicator flag bit is not set for that device, then the second data storage system 16 knows immediately that no lower level storage unit or location such as a volume or track in that device has that attribute. If any lower data storage element in the hierarchical structure such as a track or volume includes the attribute, than the attribute or flag bit for the device will be set.

Similarly, if a particular data storage location such as a record or track which is part of a logical volume has the requested attribute, then the corresponding attribute or flag bit for the volume will be set. The data storage system 16 can thereby quickly determine whether any data storage location having a lower level than the volume or other similar logical or physical partition being examined has the particular attribute, without scanning or searching each and every lower level data storage location.

The "in-cache" flag or bit is an exception to the hierarchical structure in that since each line or entry 50–56 of the data map/table 24 is directly addressable, the second data storage system directly addresses the table entry line for a particular data element when it must inquire or "look-up" whether that particular data element is presently "in-cache". It is understood, however, that this flag or bit could be managed in a hierarchical fashion without departing from the scope of this invention.

In addition to the in-cache bit or flag 58 and the write pending flag or bit 61, the data map/table 24 which is one feature of the present invention includes, in the preferred embodiment, other flag bits 62 such as an invalid track format flag or bit, and an indication of whether or not data on a particular device, volume or track needs migration or has been migrated from the first to the second data storage system 14/16 respectively, as shown generally by flag or indicator bit 60.

Data map/table 24 may further include a physical address 64 entry for each element in the map or table 24, which identifies the beginning data address 64 at which the corresponding data element can be found on the disk drive 17a–17n of the new or second data storage system 16.

Figure 3:
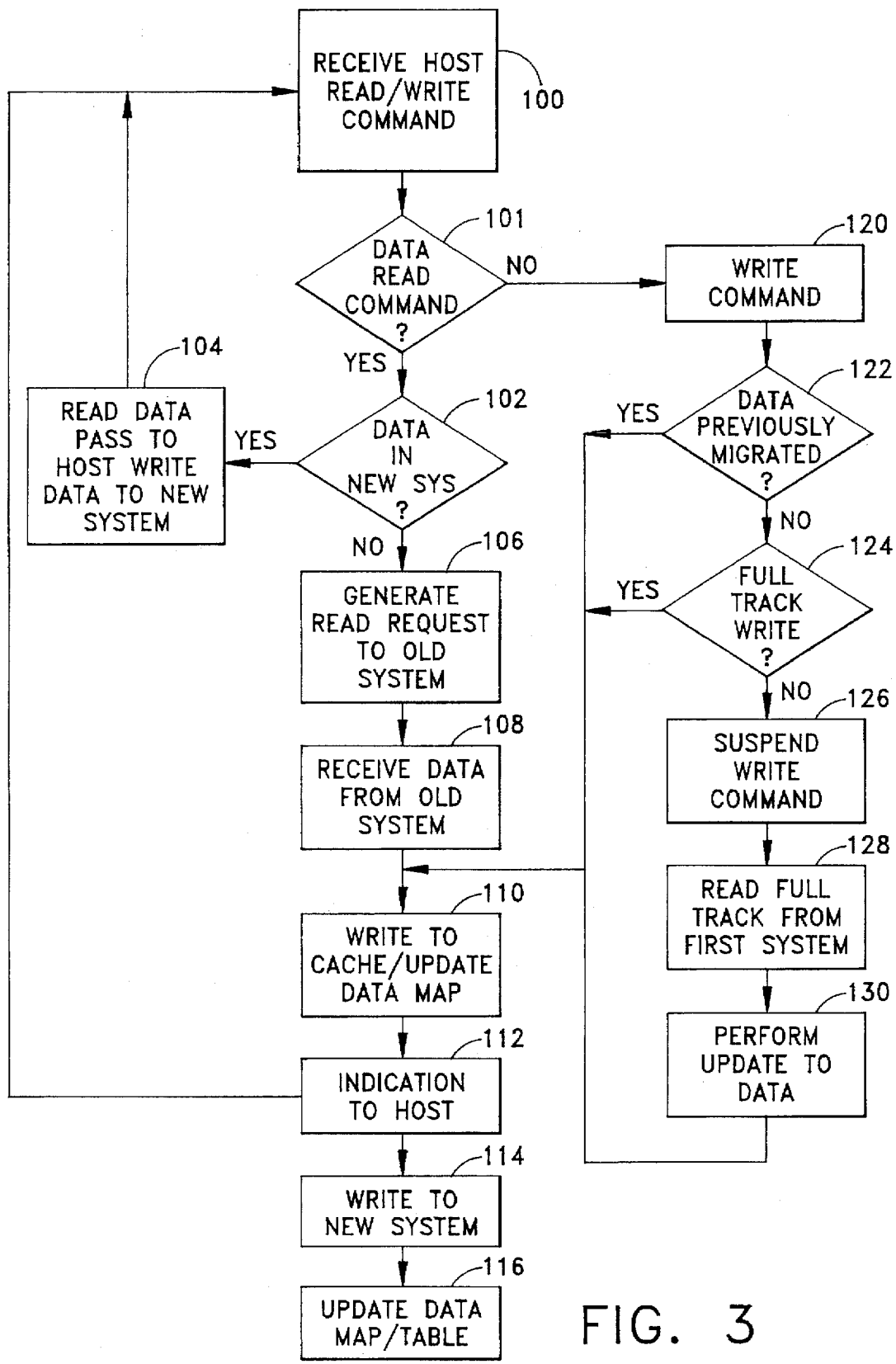
FIG. 3 is a flowchart outlining the steps of providing on-line, transparent data migration between first and second data storage systems according to the method of the present invention.

The operation of the method according to the present invention will be described in greater detail beginning with step 100, FIG. 3, wherein the second data storage system 16 receives a data element read or write request from the host or other data processing device 12, step 100. The method next determines if the request or command is a read or a write request, step 101. If the command is a read command, the channel handling process 25 of the second data storage system 16 next determines if the requested data is already stored in the second data storage system 16, step 102, by reading its data table map/table 24.

If the data is stored on the second data storage system, step 102, the second data storage system 16 will make the data available to the host or other requesting data processing device 12, step 104, and return to step 100 to await receipt of a new data read or write request.

If, however, at step 102, the second data storage system 16 determines that the data is not presently stored on the second data storage system 16, the second data storage system 16 will generate a request to the first data storage system 14 to read the data, step 106.

The command or request to read data from the first data storage system 14 takes the same form as a read data command which would be issued from the host 12. Thus, for example, if the host 12 is an IBM or IBM compatible host or data processing device, the second data storage system 16 will issue an IBM compatible "read" command to the first data storage system 14. The channel and migrate processes 25,27 of the second data storage system 16 maintain a list of commands native to the first data storage system 14 and can easily convert command types, if necessary, from a first command type issued by the host 12 and understood by the second data processing system 16, to a second command type understood by the first data storage system 14.

Subsequently, the second data storage system 16 receives the requested data from the first data storage system 14, step 108 and writes the data to the cache memory 18 of the second data storage system 16 while updating the data element map/table 24, step 110. The second data storage system 16 then provides an indication to the host or data processing device 12 that the data is ready to be read, step 112. Subsequently, the second data storage system 16 will write the data from cache memory 18 to a more permanent storage location, such as a disk drive, on the second data storage system 16, step 114, followed by a final update to one or more bits or flags of the data element map/table 24, step 116.

Thus, in the case where requested data is not yet stored on the second data storage system 16, the "read request" command from the host 12 results in the second data storage system 16 "migrating" the data from the first data storage system 14 to the second data storage system 16.

If the host or other data processing system 12 issues a write request or command, step 120, the channel process 25 of the second data storage system 16 determines if the data to be written has been previously migrated from the first to the second data storage system, step 122. If the data has been previously migrated, step 122, the second data storage system writes the data to cache and updates any necessary flags or bits in the data map/table 24, step 110. Processing continues as previously described.

If, however, the data has not been previously migrated, step 122, the method of the present invention next determines, by the type of command or request issued by the host (for example in the case of IBM host commands), whether or not the write request is for a full or complete data element storage location, such as a full or complete "track" of data, step 124. If the write request is for a full "track" or other similar type of data block or content, the second data storage system does not need to worry about migrating the date from the first data storage system 14 since all the "old"

data is being replaced by the current command and therefore, processing continues to step 110 as previously described.

If however, the method determines that the write request is for less then a full or complete data block or confine, such as a track, step 124, the method next temporarily suspends handling of the write request, step 126 and issues a "read" command for the full or complete "track" to the first data storage system 14, and reads a predetermined amount of data (a whole track of data for example), step 128, and copies the full "track" of data to the cache memory 18 of the second data storage system 16. The new data to be written is then written into the proper memory location in cache memory 18 (the occurrence of the actual "write" command), the data table/map 24 updated (for example, to indicate that the data is in cache memory 18 [data in cache bit set], that a write is pending on this data [write pending bit set], and that the data elements have been migrated [data needs migration bits re-set]) and the host or other central processing unit 12 informed that the write command is complete.

At some later time, the data in cache memory 18 which has been flagged as write pending is copied to a more permanent storage location, such as a disk drive, and the write pending bit reset.

Typically, data write requests are performed to update only a portion of the total or complete number of data elements stored in a predetermined data storage element or physical/logical confine (such as a disk drive track). The present invention, however, also realizes that in some cases, such as when the host or data processing unit 12 provides an indication that both the data structure (format) as well as the actual data contents are to be updated, reading old data from the first data storage system 14 may be eliminated since all data and data format or structure will be updated with the new write request. Such a data and format write command is so infrequent, however, that the preferred embodiment contemplates that each write request will cause a write request to be read from the first data storage system 14.

The method of present invention also allows the second or new data storage system 16 to provide transparent or "background" data migration between the first data storage system 14 and the second data storage system 16 irrespective of or in parallel with the data transfer or migration caused by the channel process which is serving the "channel" between the host 12 and the second data storage system 16. Since the goal of providing the second or new data storage system 16 is to generally provide enhanced or increased capabilities to the host or other data processing system 12, it is therefore desirable to migrate the data as quickly yet as unobtrusively as possible from the first to the second data storage system.

Figure 4:
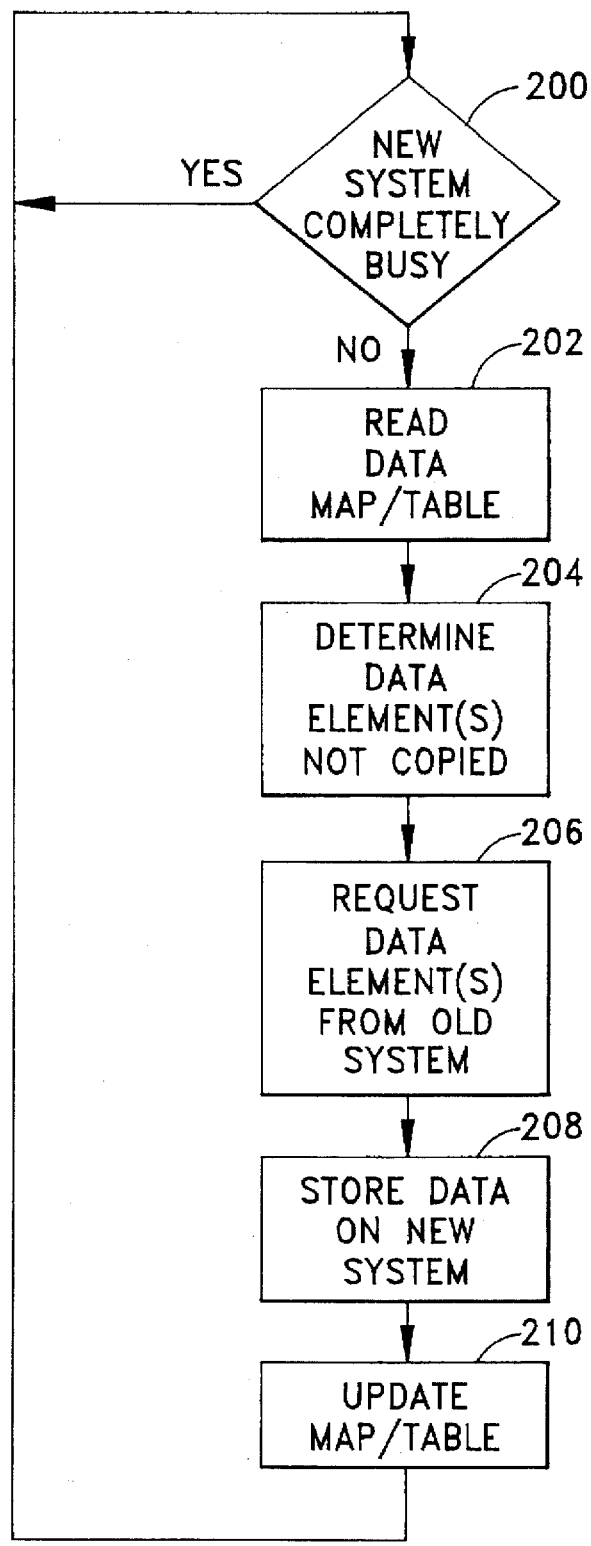
FIG. 4 is a flowchart illustrating the steps for providing data migration between first and second data storage systems without data storage device or host system intervention when the second data storage device is not busy handling data requests from the host or data processing device.

Thus, with the background migrate or copy "task" or "process" 27, the method of the present invention which is a series of software instructions executed by a central processing unit in the second data storage system 16 according to the present invention (such hardware and software as is well known in the art, see for example the EMC Symmetrix series 5500 data storage systems), the present method first determines whether the second data storage system 16 is completely busy servicing read or write data requests from the host or other connected data processing system 12, step 200, FIG. 4. If the second data storage system 16 is completely busy handling such requests to and from the host or data processing system 12 or completely busy handling other data input/output (I/O) operations in the second data storage system 16, further processing does not take place but instead the migrate process 27 awaits a "no busy" or "available" indication from the operating system of the second data storage system 16.

Once the second data storage system 16 is not busy handling internal input/output (I/O) requests or requests from the host or data processing device 12, the second data storage system 16 reads the data map/table 24, step 202 and determines which data elements have not been copied from the first data storage system 14 to the second data storage system 16, step 204.

As previously mentioned, during initial configuration of the second data storage system 16, before the second data storage system comes "on line", the user or system engineer will utilize a system configuration device 26, such as a personal computer or other input device, to configure at least a portion of the data storage locations 17a–17n in the second data storage system 16 to exactly emulate (i.e. have the same memory addresses) the data storage system configuration of the first or older data storage system 14. Generally, the new or second data storage system 16 will have a greater storage capacity than the first or "old" data storage system 14 and therefore, additional storage areas or locations will become available. Therefore, if the first data storage system 14 includes a predetermined number of drives or volumes, each drive or volume having a certain number of tracks or records, the second data storage system will be configured to imitate such a configuration.

Once the second data storage system 16 has determined that least one data element (such as a track) has not been copied from the old or first data storage system 14, the second data storage system 16 issues a request to the first data storage system 14 for the data element, step 206. Once received, the second data storage system 16 stores the data on the second data storage system 16 (typically in cache memory 18), step 208, updates the second data storage system data map/table 24, step 210, and returns to step 200 to determine whether or not there is a pending data read or write request from the host or other data processing system 12.

In one embodiment, the present invention contemplates that it may be desirable to "prefetch" data from the first data storage system 14 to the second data storage system 16. For example, the migrate or copy process 27 may, using commands native to the first data storage system 14, issue a prefetch or "sequential" data access request or command to the first data storage system 14, to cause the first data storage system 14 to continue to fetch or 'prefetch' a certain number of data elements to the cache memory 18 of the second data storage system 16. Such prefetching can significantly speed up the transfer of data between the first and second data storage systems 14,16 by greatly reducing the number of "read" commands which must be passed between the data storage systems.

In another embodiment, the migration process 27 may determine that one or more read requests from the host 12 are part of a sequence of such read requests. In such an instance, the channel process 27 may take the current address of data being requested by the host 12 and increase it by a predetermined number. For example, if the host 12 is currently requesting data from an address '411', the channel process 25 will issue a read request to the first data storage system 14 for the data at address 411. Generally simultaneously, the channel process will pass an indication to the migrate process 27 to begin prefetching or migrating data from address '413'. Thus, the migrate process 27 will be used to insure that the second data storage system 16 gets 'ahead' of the channel process 25 and the actual data requests from the first data storage system 14. The channel process 25 will handle requests from the host 12 for data at addresses 411 and 412. Subsequent requests will already be in cache in the second data storage system 16 and quickly handled by the second data storage system 16.

Accordingly, the present invention provides a unique data storage system and method which allows a new or second data storage system to be connected to an existing host or other data processing device with essentially no time loss in access to the data stored on a first data storage system. While maintaining real time, on-line availability of the data to the host or other connected data processing device, the system and method of the present invention provides accessibility to current and past data. With background operations, data is migrated from the first or older data storage device to the new data storage system.

Although the present invention is preferably implemented in software, this is not a limitation of the present invention as those well know in the art can appreciate that the present invention can be implemented in hardware of in various combinations of hardware and software, without departing from the scope of the invention.

Modifications and substitutions by one of ordinary skill in the art are considered to be within the scope of the present invention which is not to be limited except by the claims which follow.

What is claimed is:

1. A replacement storage device for supplanting a first data storage device in a data processing system including a host computer for processing data, interface means on each of the host computer means and the first data storage device, and a link connecting the interface means, the host computer means issuing requests to transfer data to and from the first data storage device over the link, said replacement data storage device comprising:

A) a data store;

B) first connection means for connection to the interface means on the host computer means in lieu of link, C) second connection means for connection to the interface means of the first data storage in lieu of the link, D) first transfer means connected to said first connection means and said data store for receiving transfer requests from the host computer, E) second transfer means connected to said connection means for effecting a migration of data from addressed locations in the first data storage device to corresponding locations in said data store, F) data maps means initialized to a predetermined state prior to the data migration for maintaining the status of the data migration, and G) control means responsive to said data map means for normally selecting said second transfer means for migrating data from the first data storage device to said data store in said replacement data storage device, said control means responding to a data transfer request to said first transfer means by enabling said second transfer means to effect a transfer of the data identified by the data transfer request between said data store and the host computer, said second transfer means updating said data map means for each transfer produced thereby.

2. The system of claim 1 wherein said control means in said replacement data storage device includes said data element map.

3. The system of claim 2 wherein said control means in said replacement data storage device is responsive to an indication from said data element map indicating whether said at least one predetermined data element is stored on said replacement data storage device for selectively obtaining said at least one predetermined data element from the first data storage device through said second transfer means.

4. The system of claim 3 wherein said replacement data storage device responds to one of a read or a write command from the host computer accessing said at least one predetermined data element issued by selectively obtaining a block of data including at least said at least one predetermined data element from the first data storage device and for storing the obtained data block on said replacement data storage device in said data store.

5. In a computer system comprising a first data storage device holding a plurality of data elements and a data processing device for reading data from and writing data to the first data storage device, a second data storage device coupled to the first data storage device, said second data storage device being adapted for providing an on-line transparent data migration of data elements thereto from the first data storage device, said second data storage device comprising:

A) a data store,

B) first connection means for connection to the data processing device,

C) second connection means for connection to the first data storage device,

D) transfer means connected to said first and second connection means and said data store for receiving transfer requests from the data processing device, E) control means for enabling said transfer means to migrate data from the first storage device to said data store, said control means including a data element map for indicating whether a data element is stored on said second data storage device, and means responsive to at least said indication of whether said at least one predetermined data element is stored in said second data storage device for obtaining data from the first data storage device and for storing said obtained data on said second data storage device.

6. The system of claim 5 wherein said second data storage device includes means responsive to a read command for a predetermined data element received from the data processing device and to an indication that said predetermined data element is not stored on said second data storage device for issuing a data read command to the first data storage device for at least the predetermined data element.

7. The system of claim 5 wherein said second data storage device issues a data read command for retrieving a plurality of predetermined data elements from the first data storage device in response to a read command from the data processing device when the requested data elements are not located in said second data storage device.

8. The system of claim 7 wherein said plurality of data elements includes a plurality of sequential data elements.

9. The system of claim 5 wherein said a data element is part of a data block and second data storage device responds to a data write command received from the data processing device and to an indication that said predetermined data element is not stored on said second data storage device by transferring a corresponding block from the first data storage device prior to writing the predetermined data element to said second data storage device.

10. The system of claim 5 wherein a data element is part of a data block and said second data storage device responds to a data write command received from the data processing device for writing a predetermined data element when said data element map indicates that the block corresponding to the predetermined data element is not stored in said second data storage device by writing data element to said second data storage device.

11. The system of claim 10 wherein the first data storage device includes at least one disk with a plurality of disk drive tracks and the data block includes a disk drive track and wherein the writing of the data element transfers the corresponding disk drive track.

12. The system of claim 5 further including a data storage device configuration device coupled to said second data storage device for providing initial data storage device configuration data to said second data storage device including initial values for said data element map.

13. The system of claim 5 wherein said data processing device includes at least one host computer.

14. The system of claim 5 wherein said data processing device includes a network.

15. In a system including a data processing device connected to a first storage device for normally transferring data therebetween and a second storage device for supplanting the first storage device for at least a portion of the data stored thereon, a method for migrating the data from the first storage device to the second storage device comprising the steps of:

A. interposing the second storage device between the data processing system and the first storage device,
  B. incorporating a transfer process for reading data from the first data storage device to the second data storage device,
  C. establishing a data element map that is initialized to a predetermined state for identifying data that has migrated to the second storage device, and
  D. controlling the transfer process in response to the contents of the data element map by selecting a first transfer process mode transferring requested data in response to a transfer request from the data processing system and by selecting a second transfer process mode causing a transfer of data from sequential locations in the first data storage device when the first transfer process mode is inactive, each of the transfer process modes migrating data to the second data storage device and updating the data element map.

16. The method of claim 15 wherein said transfer process selectively transfers at least one predetermined data element from the first to the second data storage device independently of the data processor device when the second mode is selected.

17. The method of claim 15 additionally comprising the step of configuring the second storage device to be compatible with the first storage device wherein said configuration includes producing a data element map providing an indication of whether a data element having a predetermined data element storage location address is stored on said second data storage device and wherein the method responds to the receipt of the second data storage device from the data processing device of at least one of a data element read and a data element write request designating at least one data element stored at a predetermined data element storage location address on said first data storage device, the method comprising the additional steps of searching the data element map to determine if the designated data element is stored on said second data storage device, said control of said transfer process mode being determined in response to the results of said search.

18. A method for migrating data from a first data storage device previously coupled to a data processing device to a second data storage device presently coupled to the data processing device and to the first data storage device, the first data storage device including a plurality of data elements previously accessed by the data processing device, at least some of the plurality of data elements to be migrated to the second data storage device, the second data storage device including a data element map including at least an indication of whether a data element having a predetermined data element storage location address is stored on the second data storage device, said method comprising the steps of:

configuring said second data storage device to include a plurality of data element storage location addresses corresponding to data element storage location addresses on the first data storage device;

receiving at the second data storage device from the data processing device, at least one of a data element read and a data element write request for initiating the transfer of at least one data element;

searching the data element map to determine if said at least one data element is stored on the second data storage device; and selectively copying the at least one data element from the first to the second data storage device in response to said searching.

19. The method of claim 18 wherein the data processing device produces a data read request and said method performs the steps of:

determining whether the requested at least one data element is stored on the second data storage device;
  if the requested at least one data element is stored on the second data storage device, providing the requested at least one data element to the data processing device;
  if the requested at least one data element is not stored on the second data storage device, performing the steps of:
    generating a data element request to the first data storage device for the at least one data element requested by the data processing device;
    transferring the at least one data element from the first data storage device to the second data storage device, the second data storage device receiving the retrieved at least one data element from the first data storage device and providing the requested at least one data element to the data processing device.

20. The method of claim 18 wherein the data processing device produces a data write request and said method performs the steps of:

determining whether the at least one data element to be written is currently stored on the second data storage device;
  if the requested at least one data element is stored on the second data storage device, writing said at least one data element to the second data storage data storage device;
  if the at least one data element to be written is not stored on the second data storage device, performing the steps of:
    generating a data element read request to the first data storage device for the at least one data element requested to be written by the data processing device;
    transferring the at least one data element from the first data storage device to the second data storage device, the second data storage device receiving the retrieved at least one data element from said first data storage device; and writing the at least one data element from the data processing device to the second data storage device.

21. The method of claim 18, wherein prior to coupling said second data storage device to said data processing device, the first data storage device is uncoupled to the data processing device.

22. The method of claim 18 wherein the second storage device includes a cache memory and wherein said step of transferring the requested at least one data element stored in the first data storage device includes storing the received requested at least one data element in the cache memory.

23. The method of claim 18 further including the step of updating the data element map after each said step of transferring the requested at least one data element from the first data storage device.

24. The method of claim 18 further including the step of providing the requested at least one data element to the data processing device in response to a data element read request and the step of writing the requested at least one data element to the second data storage device.

25. The method of claim 18 further including the steps of:
  determining when the second data storage device is responding to one of the data element read and write requests from the data processing device; reading said data element map to determine data elements stored on the first data storage device that have not been copied to the second data storage device;
  transferring sequentially data elements which have not been copied to said second data storage device from said first data storage device when said determination is that no data element read or write request is being processed;
  storing the sequentially accessed data elements in said second data storage device; and
  updating said data element map to indicate the completion of each transfer of a data element to the second data storage device.

26. A method for migrating data from a first data storage device previously coupled to a data processing device to a second data storage device, the first data storage device including a plurality of data processing elements presently being accessed by said data processing device by means of data element transfer requests and from which at least some of said plurality of data elements are to be migrated to the second data storage device, said method comprising the steps of:
  providing the second data storage device a data element map including at least an indication of whether individual data elements are stored on the second data storage device;
  disconnecting the first data storage device from the data processing device;
  connecting the second data storage device to the data processing device;
  connecting the second data storage device to the first data storage device;
  configuring the second data storage device to include a plurality of data element storage location addresses corresponding to data element storage location addresses on the first data storage device;
  determining that the second data storage device is not busy responding to data element transfer requests from the data processing device;
  determining from the data element map which data elements stored on the first data storage device are not stored on the second data storage device;
  transferring data elements which have not been copied to the second data storage device from the first data storage device;
  storing the transferred data elements in the second data storage device; and
  updating the data element map to indicate that the transferred data elements are stored in the second data storage device.

* * * * *

UNITED STATES PATENT AND TRADEMARK OFFICE
CERTIFICATE OF CORRECTION

PATENT NO. : 5,680,640
DATED : OCTOBER 21, 1997
INVENTOR(S) : YUVAL OFEK ET AL.

It is certified that error appears in the above-identified patent and that said Letters Patent is hereby corrected as shown below:

In claim 1, line 45, after "said", insert -- second --

Signed and Sealed this

Seventeenth Day of March, 1998

*Attest:*

BRUCE LEHMAN

*Attesting Officer*   *Commissioner of Patents and Trademarks*